United States Patent

[11] 3,548,104

[72] Inventor Karl Kuepfmueller
Darmstadt, Germany
[21] Appl. No. 666,371
[22] Filed Sept. 8, 1967
[45] Patented Dec. 15, 1970
[73] Assignee International Standard Electric Corporation
New York, N.Y.
a corporation of Delaware
[32] Priority Sept. 20, 1966
[33] Germany
[31] No. K60286

[54] METHOD OF SYNCHRONIZATION IN BINARY COMMUNICATION SYSTEMS
6 Claims, 4 Drawing Figs.

[52] U.S. Cl. 179/15
[51] Int. Cl. H04j 3/06
[50] Field of Search 179/15A, (Cursory), APC, Sig, Sync; 178/69.5; 325/38A, (Cursory)

[56] References Cited

UNITED STATES PATENTS

| | | | |
|---|---|---|---|
| 2,406,165 | 8/1946 | Schroeder | 179/15 |
| 2,416,424 | 2/1947 | Wilson | 179/15 |
| 2,527,638 | 10/1950 | Kreer et al. | 179/15 |
| 2,927,965 | 3/1960 | Waer | 179/15 |
| 3,341,660 | 9/1967 | Duerdoth | 179/15 |
| 2,996,578 | 8/1961 | Andrews Jr. | 325/38 |
| 3,133,280 | 5/1964 | Crater | 325/38 |
| 3,200,198 | 8/1965 | McRae | 179/15 |
| 3,467,782 | 9/1969 | Plouffe et al. | 179/15 |

*Primary Examiner*—Kathleen H. Claffy
*Assistant Examiner*—David L. Stewart
*Attorneys*—C. Cornell Remsen, Jr., Rayson P. Morris, Percy P. Lantzy, Philip W. Bolton and Isidore Togut

ABSTRACT: A composite binary signal is produced from a single rectangular oscillation where the presence of half cycles of the oscillation represents binary "1" and absence of these half cycles represents binary "0". One or more negative or positive half cycles of the oscillation define time slots into which are inserted positive or negative synchronizing pulses respectively. The synchronizing pulse or pulses are extracted by recovering the oscillation from the composite signal, inverting this recovered oscillation, adding this inverted oscillation to the composite signal to increase the amplitude of only the synchronizing pulse or pulses, and detecting only the pulse or pulses of increased amplitude.

INVENTOR
KARL KÜPFMÜLLER
BY Alfred C. Hill
AGENT

INVENTOR
KARL KÜPFMÜLLER

BY Alfred C. Hill
AGENT

METHOD OF SYNCHRONIZATION IN BINARY COMMUNICATION SYSTEMS

BACKGROUND OF THE INVENTION

This invention relates to binary communication systems and more particularly to a method of synchronization in binary communication systems.

In communication systems of the binary type employing time division multiplex operation, the signals must be received synchronously in the receiver to enable distribution of the time multiplexed channel signals to the appropriate communication channels or utilization devices. To this end special synchronizing signals must be inserted in the sequence of information signals.

A first method of synchronizing the receiver is known which employs a combination of pulses. For example, a certain combination of eight pulses of a binary channel may serve this purpose, or else a certain combination of pulses which is inserted after each channel frame. However, since these combinations may also appear accidentally in the sequence of information signal pulses, a large number of combinations must be checked in the receiver with respect to their periodic occurrence. Therefore, in cases where synchronization is lost it may take a relatively long time until synchronization is achieved for connecting the appropriate communication channel signal to its proper communication channel or utilization device. A time delay such as this is undesirable.

A second method is known by which an immediate synchronization can be effected after each individual synchronizing pulse. This second method is described in the article "Transmission Aspects of Communication Networks," I.E.E. Electronics Division, Feb. 1964, Pages 202—204. This second method is based on so called bipolar transmission of binary signals and consists of positive and negative pulses representing a binary 1 and the absence of pulses representing a binary 0. The particular characteristic of this second method is that the pulses representing binary 1 alternate in polarity, that is, adjacent binary 1 *s* are represented by alternate polarity pulses regardless of the number of binary 0 *s* present therebetween. Synchronization is accomplished in this second method by inserting a synchronizing pulse into the time multiplex binary signal so that it has the same polarity as the last pulse of the frame signal. In this way, the double polarity pulse enables the receiving equipment to distinguish from the other pulses. Thus, the receiving equipment detects the sequence of two pulses of the same polarity and utilizes these detected pulses to effect the desired synchronization.

SUMMARY OF THE INVENTION

An object of the present invention is to provide a method of synchronization in a binary communication system which like the above mentioned second method requires only one pulse for effecting immediate synchronization.

Another object of the present invention is to provide a method of synchronization in a binary communication system which in accordance with the principles of this invention employs a plurality of synchronizing signals to protect the synchronization information against disturbances in the transmission of the binary signal and to bring about the required synchronization and distribution of the multiplexed communication signals.

A feature of this invention is the provision of a method of synchronization in binary communication systems comprising the steps of producing a rectangular wave oscillation having at least one given half cycle of the oscillation defining the time slot for at least one synchronizing pulse and each of the other half cycles of the oscillation defining the time slots for the digits of a binary signal; generating from the oscillation a binary signal having the presence of the other half cycles of the oscillation representing one binary condition and the absence of the other half cycles of the oscillations representing the other binary condition; and inserting a synchronizing pulse in the time slot defined by the given half cycle of the oscillation in phase opposition to the given half cycle of the oscillation to provide a composite binary signal for transmission.

Another feature of this invention is the provision of further steps of recovering from the composite binary signal the oscillation; inverting the recovered oscillation; adding the inverted oscillation and the composite binary signal to increase the amplitude of the synchronizing pulse only; and detecting the increased amplitude synchronizing pulse only to recover the synchronization information.

Still a further feature of this invention is the provision of providing a plurality of half cycles of the oscillation having the same given polarity to define time slots for a plurality of synchronizing pulses; and inserting a synchronizing pulse in each of the time slots defined by the polarity of half cycles of the oscillation in phase opposition to the given polarity to provide the composite binary signal.

Still a further feature of this invention is the provision of the further steps of recovering from the last mentioned composite binary signal the oscillation; inverting the recovered oscillation; adding the inverted recovered oscillation and the composite binary signal to increase the amplitude of each of the synchronizing pulses only; detecting each of the increased amplitude synchronizing pulses only; integrating the detected increased amplitude synchronizing pulses; and extracting the synchronization information when the integration of the detected synchronizing pulses exceed a given amplitude.

BRIEF DESCRIPTION OF THE DRAWINGS

The above mentioned and other features and objects of this invention will become more apparent by reference to the following description taken in conjunction with the accompanying drawings, in which:

Referring to FIG. 1, Curve A, there is illustrated therein an example of the sequence of unipolar signals of two successively following communication channels, namely, channel 24 and channel 1. In this example, each channel comprises binary signals of eight digits per channel with 24 channels constituting one frame. There is provided a time interval *t* for each bit with the frequency $f_b = \frac{1}{t}$ being referred to as the bit frequency. Between channel 24 of the first frame and channel 1 of the following frame there is left a time slot having a time duration of *t* into which a synchronizing pulse may be inserted.

Referring to FIG. 1, Curve B, there is illustrated the same binary signal in bipolar form of the second prior art method. For synchronizing purposes, the last pulse representing a binary 1 of the frame is followed by a synchronizing pulse S of the same polarity. All the remaining signal pulses representing a binary 1 of all 24 channels are of alternating polarity within each frame. Due to the presence of two pulses of the same polarity in the signal of FIG. 1, Curve B, the receiving equipment can detect these two pulses of the same polarity and utilize the resultant detected output for synchronization.

Referring to FIGS. 2 and 3, the synchronization method of the present invention will now be discussed. Rectangular wave generator 1 provides a rectangular wave output as illustrated in Curve B, FIG. 3 having a frequency *f* equal to one-half the bit frequency $f_b$. Switch means 2 which is controlled by source 3 of unipolar code, such as illustrated in Curve A, FIG. 3, produces bipolar binary signals as illustrated in Curve C, FIG. 3. Switch means 2 is illustrated symbolically as including relay 4 and relay contact 5 arranged so that when the code of source 3 is in a binary 1 condition, contact 5 is closed and the oscillation of generator 1 is passed to transmitter 10. When the code of source 3 is in a binary "0" condition, contact 5 is open and no oscillation is passed to combiner 6. It will be immediately recognized that switch means 2 need not be electromagnetic as illustrated for purposes of explanation but may be any equivalent electronic switching arrangement known in the art.

One of the half cycles of the oscillation from generator 1, such as half cycle 7, defines a synchronizing time slot having a duration $t$ as illustrated in Curve B, FIG. 3. Synchronizing pulse source 8 energizes a relay 19 similar to relay 4 in the switch means 2 and its contact 20 closes. By means 6 the oscillation of generator 1 is inverted and a pulse of polarity opposite to the polarity of he half cycle 7 of oscillation as shown in Curve C, FIG. 3 is passed. As illustrated half cycle 7 has a negative polarity while synchronizing pulse S from source 8 has a positive polarity. At the output of switch means 2 there is obtained the composite binary signal as illustrated in Curve C, FIG. 3. Timing source 9 controls the timing of generator 1 and sources 3 and 8. The receiver timing source must be synchronous with the transmitter timing source 9 which is accomplished by the synchronizing pulse present in the composite binary signal.

The output of switch means 2 is coupled to a transmitter which transmits the composite binary signal through a propagation medium to a distant receiver. These components are illustrated by a single block 10 and may be in the form of line or radio equipment.

Figure 1:
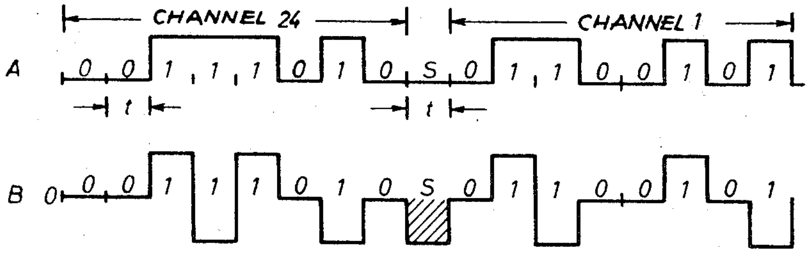
Fig. 1 (PRIOR ART)
FIG. 1 illustrates the second prior art method of synchronization mentioned hereinabove under the section "-Background of the Invention"
Figure 3:
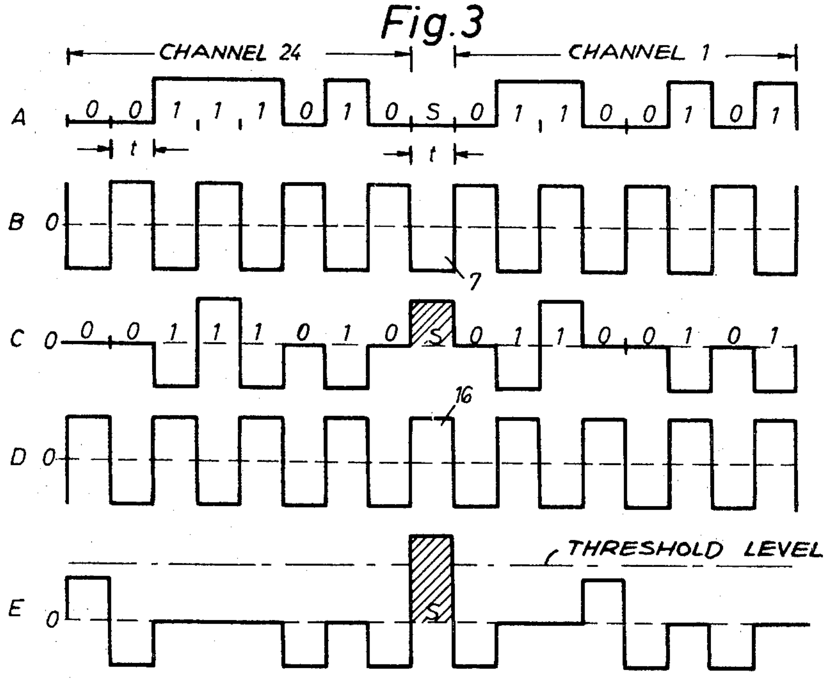
FIGS. 3 and 4 are timing diagrams of signals A—E occurring at correspondingly lettered locations in FIG. 2.

The received composite binary signal appears at the output of block 10 and is applied to a pulse former, such as amplitude limiter 11 to provide an amplitude limited composite binary signal as is illustrated in Curve C, FIG. 3. The output of limiter 11 is coupled to adder 12. The composite binary output of block 10 is also coupled to means 13, such as a filter, resonant at frequency $f$, the frequency of oscillation of the output of generator 1, and provides at the output thereof, from the composite binary signal, an oscillation identical to the output of generator 1 as illustrated in Curve B, FIG. 3. The output of means 13 is coupled to a pulse former in the form of amplitude limiter 14 with the output therefrom being inverted by inverter 15 to produce the signal as illustrated in Curve D, FIG. 3. This inverted version of the oscillation of Curve B, FIG. 3 is coupled to adder 12 wherein the inverted oscillation and the composite binary signal are added together to provide the waveform illustrated in Curve E, FIG. 3. It will be recognized from Curve E, FIG. 3 that only the synchronizing pulse S is increased in amplitude due to the inphase addition of synchronizing pulse S of Curve C and the positive half-wave oscillation 16 of Curve D, FIG. 3. The other pulses and half-wave cycles of Curves C and D either cancel one another, or only provide an amplitude equal to one-half the amplitude of increased amplitude synchronizing pulse S of Curve E, FIG. 3. The output of adder 12 is coupled to an amplitude threshold means 17 to detect the increased amplitude synchronizing pulse of Curve E where the threshold level of means 17 is greater than the normal amplitude of the binary information pulses but less than the total amplitude of the synchronizing pulse S of Curve E, FIG. 3. As synchronization may appear during positive or negative half cycles, there is provided a positive and a negative threshold. This threshold detected increased amplitude synchronizing pulse is then applied to the receiver timing source for synchronization thereof to the transmitter timing source 9.

By employing the same rule of generation, it is also possible to insert several successively following synchronizing pulses, or ones which are distributed throughout the frame without this requiring the employment of any further special pulse recognition devices. In this way it is possible to obtain a higher security of synchronization with respect to disturbances, or else the special marking or identification of a certain channel of the time multiplexed binary signal.

Figure 2:
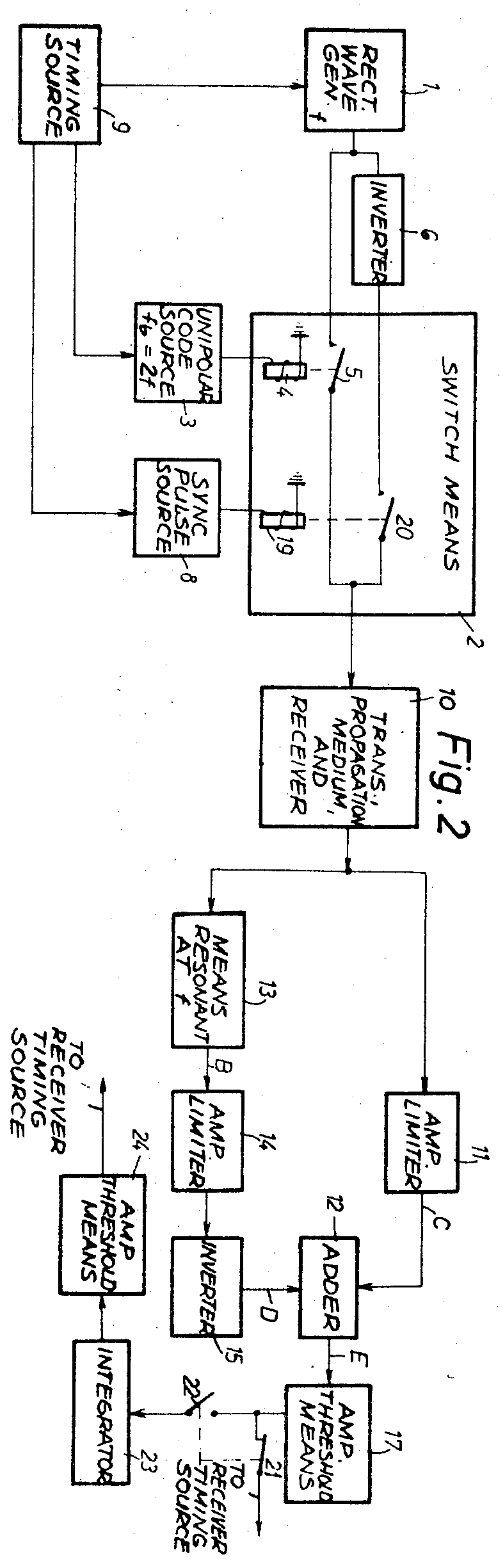
FIG. 2 is a block diagram of apparatus employed in carrying out the method in accordance with the principles of this invention.
Figure 4:
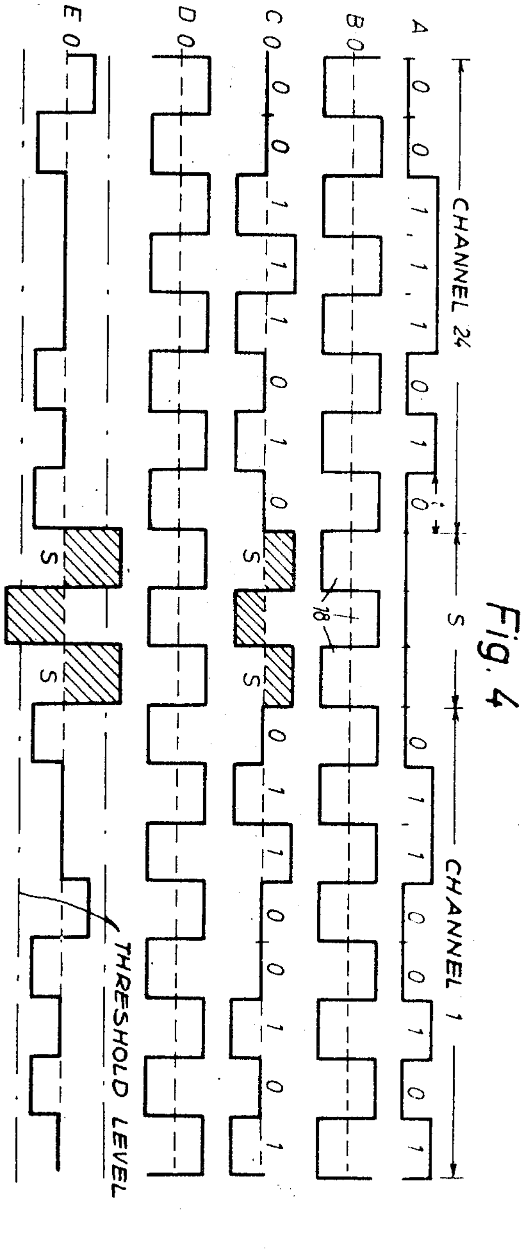

In the case of successively following synchronizing pulses reference is made to FIGS. 2 and 4 which illustrate the operation of FIG. 2 modified to provide in the example illustrated three successively following synchronizing pulses. It should be recalled, however, that this is only for purposes of explanation and a greater plurality of synchronizing pulses may be provided.

As before the unipolar code of source 3, as illustrated in Curve A, FIG. 4, controls switch 5 to pass the output from the single rectangular wave generator 1 to transmitter 10. The output of rectangular wave generator 1 is illustrated in Curve B, FIG. 4 wherein the half cycles 18 are used to define the time slot for the three synchronizing pulses provided from source 8 by closing switch 20. The output of switch means 2 is illustrated in Curve C, FIG. 4 and includes therein three synchronizing signals S having a polarity opposite to the polarity of the half cycles 18 of Curve B, FIG. 4. As in the case described with reference to FIG. 3 the output of block 10 is coupled to limiter 11 and to means 13. The output from means 13 is coupled to limiter 14 and inverter 15 to provide the signal illustrated in Curve D, FIG. 4. The output of limiter 11 and inverter 15 is coupled to adder 12 to provide the signal as illustrated in Curve E, FIG. 4. This curve now has three synchronizing pulses of increased amplitude so that threshold means 17 can be used, as in the case of FIG. 3, to detect these three increased amplitude synchronizing pulses. Switch 21 is opened and switch 22 is closed to couple an integrator 23 to the output of means 17 to provide an integrated output in response to the three increased amplitude synchronizing pulses S. The output of integrator 23 is in turn coupled to amplitude threshold means 24 which has a threshold level sufficient to permit the integrated output of integrator 23 to exceed this threshold level when the three pulses are detected by but which will not be exceeded if only one or two of these three synchronizing pulses, or a disturbance is detected. The output of means 24 is then coupled to the receiver timing source to synchronize the same to the timing source 9 of the transmitter.

While I have described above the principles of my invention in connection with specific apparatus it is to be clearly understood that this description is made only by way of example and not as a limitation to the scope of my invention as set forth in the objects thereof and in the accompanying claims.

I claim:

1. A method of synchronization in binary communication systems comprising the steps of:

a. producing a bipolar rectangular wave oscillation having at least one given half cycle of said oscillation defining a time slot which can contain only one synchronizing pulse and each other positive and negative half cycles of said oscillation defining the time slots for the digits of a binary signal in a given frame interval;

b. generating from said oscillation a bipolar binary signal having the presence of said other positive and negative half cycles of said oscillation representing one binary condition and the absence of said other positive and negative half cycles of said oscillation representing the other binary condition;

c. inverting said bipolar rectangular wave oscillation; and d. inserting one half cycle of said inverted oscillation as a synchronizing pulse in the time slot defined by said at least one given half cycle of said oscillation to provide a composite binary signal for transmission, said half cycle of said inverted oscillation being in phase opposition to said at least one given half cycle of said oscillation.

2. The method according to claim 1, further including the steps of:

recovering from said composite binary signal said oscillation;

inverting said recovered oscillation;

adding said inverted recovered oscillation and said composite binary signal to increase the amplitude of said synchronizing pulse only; and detecting said increased amplitude synchronizing pulse only to recover the synchronization information.

3. The method according to claim 2, further including the steps of:

amplitude limiting said composite binary signal prior to said step of adding; and amplitude limiting said recovered oscillation prior to said step of inverting.

4. The method according to claim 1 in which said bipolar rectangular wave oscillation has a plurality of given half cycles of said oscillation defining a corresponding plurality of time slots each of which can contain only one synchronizing pulse, and in which a plurality of half cycles of said inverted oscillation are individually inserted as synchronizing pulses into said time slots in such a manner than the individually inserted half cycles of said inverted oscillation are in phase opposition to the half cycle of said oscillation which defines the time slot into which the individually inserted half cycles are inserted.

5. The method according to claim 4, further comprising the steps of:

recovering from said composite binary signal said oscillation;

inverting said recovered oscillation;

adding said inverted recovered oscillation and said composite binary signal to increase the amplitude of each of said synchronizing pulses only;

detecting each of said increased amplitude synchronizing pulses only;

integrating said detected increased amplitude synchronizing pulses; and extracting the synchronization information when the integration of said detected synchronizing pulses exceed a given amplitude.

6. The method according to claim 5, further including the steps of:

amplitude limiting said composite binary signal prior to said step of adding; and amplitude limiting said recovered oscillation prior to said step of inverting.